US008665264B2

(12) United States Patent
Hou et al.

(10) Patent No.: US 8,665,264 B2
(45) Date of Patent: Mar. 4, 2014

(54) LCD PANEL AND LCD DEVICE

(75) Inventors: Hung-Lung Hou, Shenzhen (CN); Chia-Yu Lee, Shenzhen (CN); Chengming He, Shenzhen (CN)

(73) Assignee: Shenzhen China Star Optoelectronics Technology Co., Ltd., Shenzhen, Guangdong-Province (CN)

( * ) Notice: Subject to any disclaimer, the term of this patent is extended or adjusted under 35 U.S.C. 154(b) by 253 days.

(21) Appl. No.: 13/381,081

(22) PCT Filed: Dec. 5, 2011

(86) PCT No.: PCT/CN2011/083489
§ 371 (c)(1), (2), (4) Date: Dec. 27, 2011

(87) PCT Pub. No.: WO2013/075367
PCT Pub. Date: May 30, 2013

(65) Prior Publication Data
US 2013/0127829 A1 May 23, 2013

(30) Foreign Application Priority Data
Nov. 23, 2011 (CN) .......................... 2011 1 0380476

(51) Int. Cl.
*G06T 15/00* (2011.01)
*G09G 5/00* (2006.01)

(52) U.S. Cl.
USPC .......................................... 345/419; 345/211

(58) Field of Classification Search
None
See application file for complete search history.

(56) References Cited

U.S. PATENT DOCUMENTS

2008/0068524 A1 3/2008 Kim
2009/0207113 A1 * 8/2009 Lee et al. ........................ 345/87
2011/0096064 A1 * 4/2011 Sun ............................... 345/212
2012/0182489 A1 * 7/2012 Wang et al. ..................... 349/38

FOREIGN PATENT DOCUMENTS

CN 1877406 A 12/2006
CN 101512628 A 8/2009
CN 101520578 A 9/2009
CN 101903938 A 12/2010
CN 102034448 A 4/2011
WO 2010/137230 A1 12/2010
WO 2011/045978 A1 4/2011

* cited by examiner

*Primary Examiner* — Kee M Tung
*Assistant Examiner* — Frank Chen
(74) *Attorney, Agent, or Firm* — Cheng-Ju Chiang

(57) ABSTRACT

A liquid crystal display (LCD) device and an LCD panel are disclosed. The LCD panel comprises charging scanning lines, discharging scanning lines, first data lines, second data lines and pixel units. The charging scanning lines and the discharging scanning lines are arranged alternately and parallel with each other in a first direction. The first data lines and the second data lines are arranged parallel with each other in a second direction and insulatedly intersect the charging scanning lines and the discharging scanning lines. Each pixel unit comprises a charging TFT, a discharging TFT and a pixel electrode. When two adjacent charging scanning lines are being scanned in the LCD panel, two adjacent discharging scanning lines located in other rows different from those of the two adjacent charging scanning lines being scanned are scanned within a same scanning time frame. The LCD panel can extend the charging time of gates.

20 Claims, 4 Drawing Sheets

LCD PANEL AND LCD DEVICE

FIELD OF THE INVENTION

The present disclosure generally relates to a liquid crystal display (LCD) panel, and more particularly, to an LCD panel adapted to operate at a high frame rate; and the present disclosure also relates to an LCD device comprising the LCD panel.

BACKGROUND OF THE INVENTION

An LCD has advantages of portability, low power consumption, and low radiation. Therefore, the LCD has been widely used in various information products such as TV sets, notebooks, computers, mobile phones and personal digital assistants (PDAs).

In a high-fineness LCD device, when the scanning lines are applied scanning signals, the gates connected to the scanning lines may be charged. Due to a large number of gates in the high-fineness LCD device, the charging time available for each of the gates becomes relatively short. If the high-fineness LCD device is further demanded for a higher frame rate, the charging time of the gates is seriously insufficient. This will cause degradation in experience of the user who uses the LCD device.

SUMMARY OF THE INVENTION

In order to overcome the problems with the prior art LCD panels that the charging time is insufficient for the gates and operations at a high frame rate cannot be satisfied, an objective of the present disclosure is to provide an LCD panel which allows for operations at a high frame rate and in which a sufficient charging time is available for each gate.

Another objective of the present disclosure is to provide an LCD device which allows for operations at a high frame rate and in which a sufficient charging time is available for each gate.

To achieve the aforesaid objectives, the present disclosure provides an LCD panel, which comprises a plurality of charging scanning lines, a plurality of discharging scanning lines, a plurality of first data lines, a plurality of second data lines, a plurality of pixel units, a data driver and a scan driver. The plurality of charging scanning lines and the plurality of discharging scanning lines are arranged alternately and parallel with each other in a first direction. Each pixel unit in a same row is connected to one of the charging scanning lines and one of the discharging scanning lines. The first data lines and the second data lines are arranged parallel with each other in a second direction and insulatedly intersect the charging scanning lines and the discharging scanning lines. Each of the pixel units comprises a charging thin film transistor (TFT), a discharging TFT and a pixel electrode. The charging TFT has a gate electrically connected to one of the charging scanning lines, a source electrically connected to one of the first data lines or one of the second data lines, and a drain electrically connected to the pixel electrode. The discharging TFT has a gate electrically connected to one of the discharging scanning lines, a source electrically connected to one of the charging scanning lines, the one of the charging scanning lines and the one of the discharging scanning lines connected to the pixel units in a same row, and a drain electrically connected to the pixel electrode. The plurality of first data lines and the plurality of second data lines are electrically connected to the data driver respectively and transmit data signals to the sources of the charging TFTs. The scan driver comprises a plurality of first output terminals and a plurality of second output terminals. The plurality of first output terminals and the plurality of second output terminals are arranged alternately. Each of the first output terminals is electrically connected to two adjacent charging scanning lines. Each of the second output terminals is electrically connected to two adjacent discharging scanning lines. Two of the charging scanning lines connected to a same first output terminal are electrically connected through a jumper, and two of the discharging scanning lines connected to a same second output terminal are electrically connected through another jumper. When two adjacent ones of the charging scanning lines are being scanned in the LCD panel, two adjacent discharging scanning lines connected the pixel units in other rows different from those of the two adjacent charging scanning lines being scanned are also scanned within a same scanning time frame.

According to a preferred embodiment of the present disclosure, one scanning is defined to correspond to one scanning time frame; and when a scanning time frame in which the two adjacent charging scanning lines are scanned and charged in the LCD panel is a first scanning time frame, the discharging scanning lines connected to the same pixel units as the two adjacent charging scanning lines being scanned are scanned in the LCD panel within a third scanning time frame.

According to a preferred embodiment of the present disclosure, when the two adjacent charging scanning lines are scanned and charged simultaneously, one of the pixel units corresponding to the two adjacent charging scanning lines is electrically connected to one of the first data lines via the source of the charging TFT of the pixel unit, and the other of the pixel units corresponding to the two adjacent charging scanning lines is electrically connected to one of the second data lines via the source of the charging TFT of the pixel unit; and the first data line and the second data line input data signals to the sources of the charging TFTs of the pixel units corresponding to the two adjacent charging scanning lines respectively.

According to a preferred embodiment of the present disclosure, when four adjacent charging scanning lines are being scanned in the LCD panel, four adjacent discharging scanning lines connected the pixel units in other rows different from those of the four adjacent charging scanning lines being scanned are scanned within a same scanning time frame.

According to a preferred embodiment of the present disclosure, the data driver applies data signals of different timings to the first data lines and the second data lines to achieve switching between two-dimensional (2D) displaying and three-dimensional (3D) displaying.

To achieve the aforesaid objectives, the present disclosure further provides an LCD panel, which comprises a plurality of charging scanning lines, a plurality of discharging scanning lines, a plurality of first data lines, a plurality of second data lines and a plurality of pixel units. The plurality of charging scanning lines and the plurality of discharging scanning lines are arranged alternately and parallel with each other in a first direction. Each pixel unit in a same row is connected to one of the charging scanning lines and one of the discharging scanning lines. The first data lines and the second data lines are arranged parallel with each other in a second direction and insulatedly intersect the charging scanning lines and the discharging scanning lines. Each of the pixel units comprises a charging TFT, a discharging TFT and a pixel electrode. The charging TFT has a gate electrically connected to one of the charging scanning lines, a source electrically connected to one of the first data lines or one of the second data lines, and a drain electrically connected to the pixel electrode. The discharging TFT has a gate electrically connected to one of the discharging scanning lines, a source electrically connected to one of the charging scanning lines, the one of the charging scanning lines and the one of the discharging scanning lines connected to the pixel units in a same row, and a drain electrically connected to the pixel electrode. When two adjacent ones of the charging scanning lines are being scanned in the LCD panel, two adjacent ones of the discharging scanning lines connected the pixel units in other rows different from those of the two adjacent charging scanning lines being scanned are also scanned within a same scanning time frame.

According to a preferred embodiment of the present disclosure, one scanning is defined to correspond to one scanning time frame; and when a scanning time frame in which the two adjacent charging scanning lines are scanned and charged in the LCD panel is a first scanning time frame, the discharging scanning lines connected to the same pixel units as the two adjacent charging scanning lines being scanned are scanned in the LCD panel within a third scanning time frame.

According to a preferred embodiment of the present disclosure, when the two adjacent charging scanning lines are scanned and charged simultaneously, one of the pixel units corresponding to the two adjacent charging scanning lines is electrically connected to one of the first data lines via the source of the charging TFT of the pixel unit, and the other of the pixel units corresponding to the two adjacent charging scanning lines is electrically connected to one of the second data lines via the source of the charging TFT of the pixel unit; and the first data line and the second data line input data signals to the sources of the charging TFTs of the pixel units corresponding to the two adjacent charging scanning lines respectively.

According to a preferred embodiment of the present disclosure, when four adjacent ones of the charging scanning lines are being scanned in the LCD panel, four adjacent ones of the discharging scanning lines connected the pixel units in other rows different from those of the four adjacent charging scanning lines being scanned are scanned within a same scanning time frame.

According to a preferred embodiment of the present disclosure, one scanning is defined to correspond to one scanning time frame; and when a scanning time frame in which the four adjacent charging scanning lines are scanned and charged in the LCD panel is a first scanning time frame, the discharging scanning lines connected to the same pixel units as the four adjacent charging scanning lines being scanned are scanned in the LCD panel within a second scanning time frame.

According to a preferred embodiment of the present disclosure, the LCD panel further comprises a data driver, and the plurality of first data lines and the plurality of second data lines are electrically connected to the data driver respectively and transmit data signals to the sources of the charging TFTs.

According to a preferred embodiment of the present disclosure, the data driver applies data signals of different timings to the first data lines and the second data lines to achieve switching between two-dimensional (2D) displaying and three-dimensional (3D) displaying.

According to a preferred embodiment of the present disclosure, the LCD panel further comprises a scan driver. The scan driver comprises a plurality of first output terminals and a plurality of second output terminals. The plurality of first output terminals and the plurality of second output terminals are arranged alternately. Each of the first output terminals is electrically connected to two adjacent charging scanning lines, and each of the second output terminals is electrically connected to two adjacent discharging scanning lines. Two of the charging scanning lines connected to a same first output terminal are electrically connected through a jumper, and two of the discharging scanning lines connected to a same second output terminal are electrically connected through another jumper.

According to a preferred embodiment of the present disclosure, the charging TFT further comprises a first charging TFT and a second charging TFT, and the pixel electrode further comprises a first sub-pixel electrode and a second sub-pixel electrode pointing to different directions. A drain of the first charging TFT is electrically connected to the first sub-pixel electrode, and a drain of the second charging TFT is electrically connected to the second sub-pixel electrode. A gate of the first charging TFT and a gate of the second charging TFT are electrically connected to a same one of the charging scanning lines, and a source of the first charging TFT and a source of the second charging TFT are electrically connected to a same one of the first data lines or the second data lines.

To achieve the aforesaid objectives, the present disclosure further provides an LCD device comprising an LCD panel. The LCD panel comprises a plurality of charging scanning lines, a plurality of discharging scanning lines, a plurality of first data lines, a plurality of second data lines and a plurality of pixel units. The plurality of charging scanning lines and the plurality of discharging scanning lines are arranged alternately and parallel with each other in a first direction. Each pixel unit in a same row is connected to one of the charging scanning lines and one of the discharging scanning lines. The first data lines and the second data lines are arranged parallel with each other in a second direction and insulatedly intersect the charging scanning lines and the discharging scanning lines. Each pixel unit comprises a charging TFT, a discharging TFT and a pixel electrode. The charging TFT has a gate electrically connected to one of the charging scanning lines, a source electrically connected to one of the first data lines or one of the second data lines, and a drain electrically connected to the pixel electrode. The discharging TFT has a gate electrically connected to one of the discharging scanning lines, a source electrically connected to one of the charging scanning lines, the one of the charging scanning lines and the one of the discharging scanning lines connected to the pixel units in a same row, and a drain electrically connected to the pixel electrode. When two adjacent charging scanning lines are being scanned in the LCD panel, two adjacent discharging scanning lines connected the pixel units in other rows different from those of the two adjacent charging scanning lines being scanned are also scanned within a same scanning time frame.

According to a preferred embodiment of the present disclosure, one scanning is defined to correspond to one scanning time frame; and when a scanning time frame in which the two adjacent charging scanning lines are scanned and charged in the LCD panel is a first scanning time frame, the discharging scanning lines connected to the same pixel units as the two adjacent charging scanning lines being scanned are scanned in the LCD panel within a third scanning time frame.

According to a preferred embodiment of the present disclosure, when the two adjacent charging scanning lines are scanned and charged simultaneously, one of the pixel units corresponding to the two adjacent charging scanning lines is electrically connected to one of the first data lines via the source of the charging TFT of the pixel unit, and the other of the pixel units corresponding to the two adjacent charging scanning lines is electrically connected to one of the second data lines via the source of the charging TFT of the pixel unit;

and the first data line and the second data line input data signals to the sources of the charging TFTs of the pixel units corresponding to the two adjacent charging scanning lines respectively.

According to a preferred embodiment of the present disclosure, when four adjacent ones of the charging scanning lines are being scanned in the LCD panel, four adjacent ones of the discharging scanning lines connected the pixel units in other rows different from those of the four adjacent charging scanning lines being scanned are scanned within a same scanning time frame.

According to a preferred embodiment of the present disclosure, the LCD panel further comprises a data driver, and the plurality of first data lines and the plurality of second data lines are electrically connected to the data driver respectively and transmit data signals to the sources of the charging TFTs.

According to a preferred embodiment of the present disclosure, the LCD panel further comprises a scan driver. The scan driver comprises a plurality of first output terminals and a plurality of second output terminals. The plurality of first output terminals and the plurality of second output terminals are arranged alternately. Each of the first output terminals is electrically connected to two adjacent ones of the charging scanning lines, and each of the second output terminals is electrically connected to two adjacent ones of the discharging scanning lines. Two of the charging scanning lines connected to a same first output terminal are electrically connected through a jumper, and two of the discharging scanning lines connected to a same second output terminal are electrically connected through another jumper.

The present disclosure has the following benefits as compared to the prior art: when two adjacent charging scanning lines are being scanned in the LCD panel of the present disclosure, two adjacent discharging scanning lines connected the pixel units in other rows different from those of the two adjacent charging scanning lines being scanned are also scanned within a same scanning time frame. As compared to the prior art where only one scanning line is scanned within one scanning period, the present disclosure can extend the charging time of gates of TFTs by reducing the number of times of scanning; and furthermore, the LCD panel can operate at a high frame rate to improve the experience of the user who uses the LCD panel and the LCD device.

DETAILED DESCRIPTION OF THE INVENTION

Figure 1:
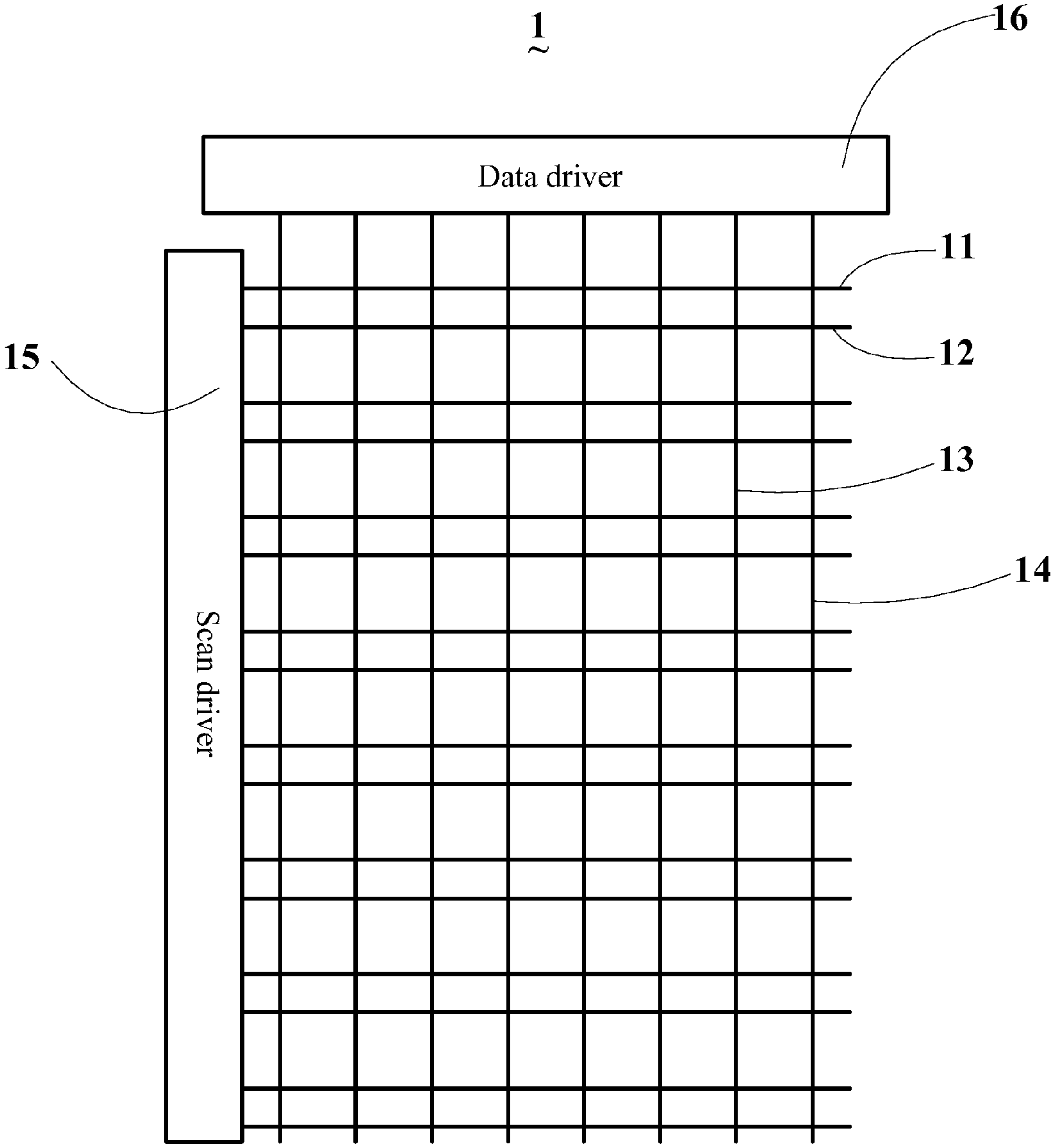
FIG. 1 is a simplified schematic view illustrating electrode wiring relationships in an LCD panel according to the present disclosure.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Referring to FIG. 1, an LCD panel of the present disclosure is described as follows.

FIG. 1 is a simplified schematic view illustrating electrode wiring relationships in an LCD panel according to the present disclosure. As shown in FIG. 1, an LCD panel 1 comprises a plurality of charging scanning lines 11, a plurality of discharging scanning lines 12, a plurality of first data lines 13, a plurality of second data lines 14, a plurality of thin film transistors (TFTs) (not shown), a plurality of pixel unit columns (not shown), a scan driver 15 and a data driver 16.

The plurality of charging scanning lines 11 and the plurality of discharging scanning lines 12 are arranged alternately and parallel with each other in a first direction; and each of the pixel units in a same row (i.e., a same pixel unit row) is connected to one of the charging scanning lines 11 and one of the discharging scanning lines 12. The first data lines 13 are arranged parallel with each other in a column direction and insulatedly intersect the charging scanning lines 11 and the discharging scanning lines 12; and the second data lines 14 are arranged parallel with each other in the column direction and insulatedly intersect the charging scanning lines 11 and the discharging scanning lines 12. The first data lines 13 and the second data lines 14 are arranged alternately.

Each of the pixel units comprises a charging TFT, a discharging TFT and a pixel electrode. The charging TFT has a gate electrically connected to one of the charging scanning lines 11, a source electrically connected to one of the first data lines 13 or one of the second data lines 14, and a drain electrically connected to the pixel electrode. The discharging TFT has a gate electrically connected to one of the discharging scanning lines 12, a source electrically connected to one of the charging scanning lines 11 located in a same pixel unit row as the discharging scanning line 12, and a drain electrically connected to the pixel electrode.

When a scanning pulse is inputted to one of the charging scanning lines 11 of the LCD panel 1, the gate of the corresponding charging TFT is turned on and a data signal of the first data line or the second data line is inputted to the pixel electrode via the source of the charging TFT. When a scanning pulse is inputted to one of the discharging scanning lines 12 of the LCD panel 1 after the scanning of the charging scanning line 11 is completed, the gate of the corresponding discharging TFT is turned on and the charging scanning line 11 located in a same pixel unit row as the discharging scanning line 12 is electrically connected to the pixel electrode via the source of the charging TFT. At this time, because the charging scanning line 11 located in the same pixel unit row as the discharging scanning line 12 has completed the scanning and keeps at a zero potential, the pixel electrode is discharged.

In order to improve the wide view angle characteristics of the LCD panel, the charging TFT further comprises a first charging TFT and a second charging TFT and the pixel electrode further comprises a first sub-pixel electrode and a second sub-pixel electrode, the first sub-pixel electrode and the second sub-pixel electrode respectively point to different directions. A drain of the first charging TFT is electrically connected to the first sub-pixel electrode, and a drain of the second charging TFT is electrically connected to the second sub-pixel electrode. A gate of the first charging TFT and a gate of the second charging TFT are electrically connected to a same charging scanning line, and a source of the first charging TFT and a source of the second charging TFT are electrically connected to a same one of the first data lines or the second data lines. By means of the two sub-pixel electrodes pointing to different directions, liquid crystal molecules can be driven to be arranged in different directions, thereby improving the wide view angle characteristics of the LCD panel.

The LCD panel 1 further comprises the data driver 16 and the scan driver 15. The plurality of first data lines 13 and the plurality of second data lines 14 are electrically connected to the data driver 16 respectively and transmit data signals to the sources of the charging TFTs. The data driver 16 can apply data signals of different timings to the first data lines 13 and the second data lines 14 to achieve switching between two-dimensional (2D)/three-dimensional (3D) displaying.

The scan driver 15 comprises a plurality of first output terminals (not shown) and a plurality of second output terminals (not shown). The plurality of first output terminals and the plurality of second output terminals are arranged alternately. Each of the first output terminals is electrically connected to two adjacent charging scanning lines 11, and each of the second output terminals is electrically connected to two adjacent discharging scanning lines 12. Two of the charging scanning lines connected to a same first output terminal are electrically connected through a jumper, and two of the discharging scanning lines connected to a same second output terminal are electrically connected through another jumper.

Figure 2:
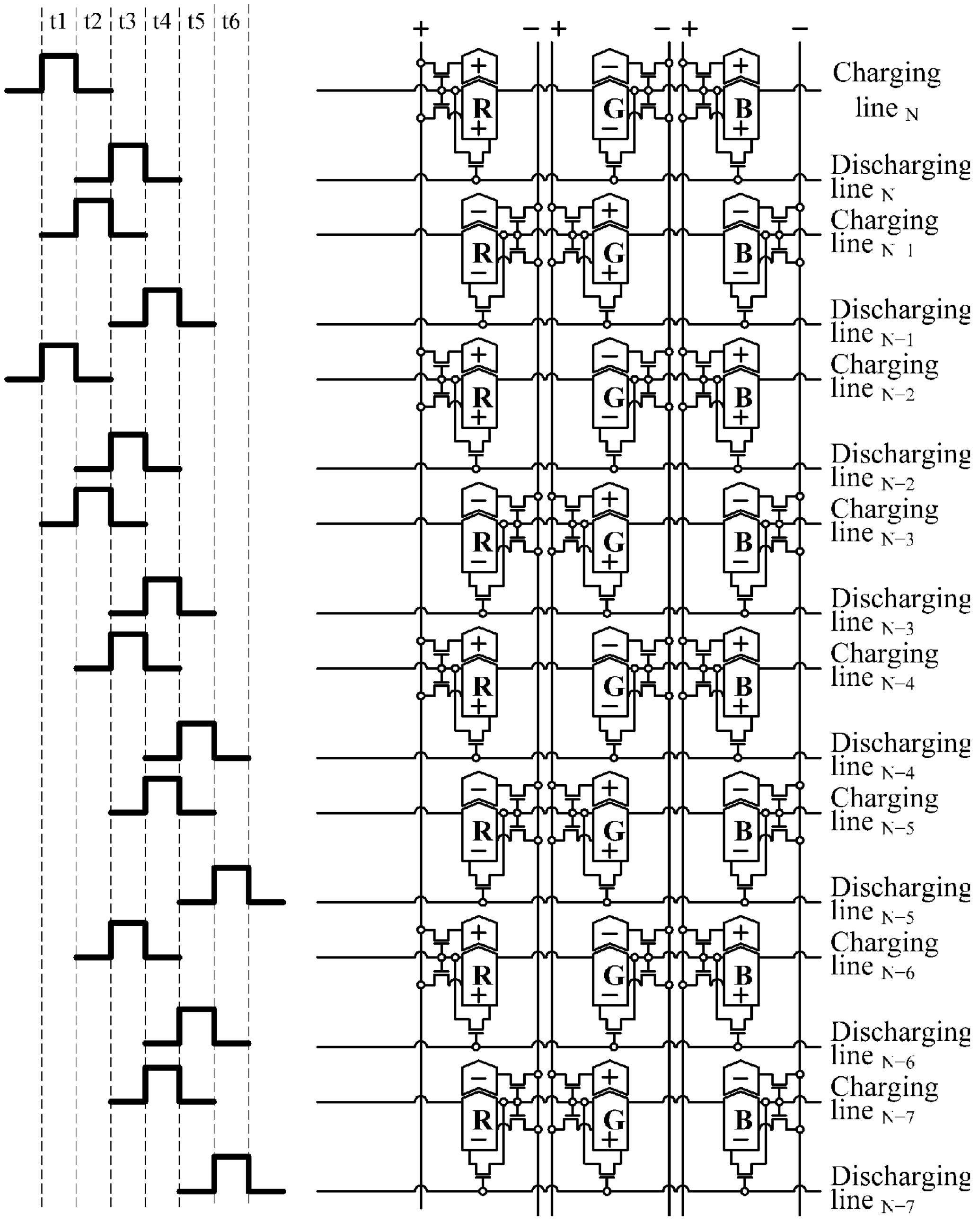
FIG. 2 is a schematic view illustrating electrode structures of the LCD panel and a scanning signal timing sequence thereof according to the first embodiment of the present disclosure.

FIG. 2 is a schematic view illustrating electrode structures of the LCD panel and a scanning signal timing sequence thereof according to the first embodiment of the present disclosure. Referring to FIG. 2, the charging scanning lines 11 are represented as a charging scanning line N to a charging scanning line N+7, and the discharging scanning lines 12 are represented as a discharging scanning line N to a discharging scanning line N+7. A charging scanning line and a discharging scanning line that have a same reference numeral are electrically connected to pixel units in a same row; e.g., the charging scanning line N and the discharging scanning line N are electrically connected to pixel units in an $N^{th}$ row. In addition, t1 to t6 represent scanning time frames in a time sequence.

As shown in FIG. 2, within the scanning time frame t1, a scanning pulse signal of a high level is inputted by the scan driver 15 into the charging scanning line N and the charging scanning line N+2 simultaneously. Then, the gates of the TFTs electrically connected to the charging scanning line N and the charging scanning line N+2 are turned on, and data voltages are inputted via the first data lines 13 and the second data lines 14 so that a corresponding image is displayed by the pixel units. At this time, both the discharging scanning line N and the discharging scanning line N+2 are in an OFF state. Therefore, at the end of the time frame t1, the data voltages of the pixel units corresponding to the charging scanning line N and the charging scanning line N+2 can be continuously maintained under the action of the storage capacitance.

Within the scanning time frame t2, both the charging scanning line N and the charging scanning line N+2 complete the scanning and keep at a low level. A scanning pulse signal of a high level is inputted by the scan driver 15 into the charging scanning line N+1 and the charging scanning line N+3 simultaneously. Then, the gates of the TFTs electrically connected to the charging scanning line N+1 and the charging scanning line N+3 are turned on, and data voltages are inputted via the first data lines 13 and the second data lines 14 so that a corresponding image is displayed by the pixel units.

Within the scanning time frame t3, both the charging scanning line N+1 and the charging scanning line N+3 complete the scanning and keep at a low level. A scanning pulse signal of a high level is inputted by the scan driver 15 into the charging scanning line N+2 and the charging scanning line N+4 as well as the discharging scanning line N and the discharging scanning line N+2 simultaneously. Then, the gates of the TFTs electrically connected to the charging scanning line N+2 and the charging scanning line N+4 are turned on; and data voltages are inputted via the first data lines 13 and the second data lines 14 so that a corresponding image is displayed by the pixel units. Moreover, because the gates of the TFTs electrically connected to the discharging scanning line N and the discharging scanning line N+2 are turned on, the data voltages of the pixel units corresponding to the charging scanning line N and the charging scanning line N+2 are discharged after having been maintained for the two time frames t1 and t2.

Within the scanning time frame t4, both the charging scanning line N+2 and the charging scanning line N+4 complete the scanning and keep at a low level. A scanning pulse signal of a high level is inputted by the scan driver 15 into the charging scanning line N+3 and the charging scanning line N+5 as well as the discharging scanning line N+1 and the discharging scanning line N+3 simultaneously. Then, the gates of the TFTs electrically connected to the charging scanning line N+3 and the charging scanning line N+5 are turned on; and data voltages are inputted via the first data lines 13 and the second data lines 14 so that a corresponding image is displayed by the pixel units. Moreover, because the gates of the TFTs electrically connected to the discharging scanning line N+1 and the discharging scanning line N+3 are turned on, the data voltages of the pixel units corresponding to the charging scanning line N+1 and the charging scanning line N+3 are discharged after having been maintained for the two scanning time frames t2 and t3.

Within the scanning time frame t5, both the charging scanning line N+3 and the charging scanning line N+5 complete the scanning and keep at a low level. A scanning pulse signal of a high level is inputted by the scan driver 15 into the charging scanning line N+4 and the charging scanning line N+6 as well as the discharging scanning line N+2 and the discharging scanning line N+4 simultaneously. Then, the gates of the TFTs electrically connected to the charging scanning line N+4 and the charging scanning line N+6 are turned on, and data voltages are inputted via the first data lines 13 and the second data lines 14 so that a corresponding image is displayed by the pixel units. Moreover, because the gates of the TFTs electrically connected to the discharging scanning line N+2 and the discharging scanning line N+4 are turned on, the data voltages of the pixel units corresponding to the charging scanning line N+2 and the charging scanning line N+4 are discharged after having been maintained for the two scanning time frames t3 and t4.

Within the scanning time frame t6, both the charging scanning line N+4 and the charging scanning line N+6 complete the scanning and keep at a low level. A scanning pulse signal of a high level is inputted by the scan driver 15 into the charging scanning line N+5 and the charging scanning line N+7 as well as the discharging scanning line N+3 and the discharging scanning line N+5 simultaneously. Then, the gates of the TFTs electrically connected to the charging scanning line N+5 and the charging scanning line N+7 are turned on, and data voltages are inputted via the first data lines 13 and the second data lines 14 so that a corresponding image is displayed by the pixel units. Moreover, because the gates of the TFTs electrically connected to the discharging scanning line N+3 and the discharging scanning line N+5 are turned on, the data voltages of the pixel units corresponding to the charging scanning line N+3 and the charging scanning line N+5 are discharged after having been maintained for the two scanning time frames t3 and t4.

Thus, the electrode structures in the first embodiment of scanning of the LCD panel and the scanning signal timing sequence thereof shown in FIG. 2 have been detailed above, and subsequent scanning and charging operations proceed in a similar way. That is, by scanning two charging scanning lines simultaneously, the total number of times of scanning operations necessary for scanning one image is reduced and, accordingly, the scanning pulse duration of each of the charging scanning lines is extended, thereby ensuring the charging time of the gates of the charging TFTs electrically connected to the charging scanning lines. As can be concluded from the LCD panel 1 according to the first embodiment of the present disclosure, when two adjacent charging scanning lines are being scanned in the LCD panel, two adjacent discharging scanning lines located in pixel unit rows different from those of the two adjacent charging scanning lines being scanned (i.e., two adjacent discharging scanning lines not located in same pixel unit rows as the two adjacent charging scanning lines being scanned) are also scanned within a same scanning time frame.

One scanning is defined to correspond to one scanning time frame; and when a scanning time frame in which the two adjacent charging scanning lines are scanned and charged in the LCD panel is a first scanning time frame, the discharging scanning lines connected to the same pixel units as the two adjacent charging scanning lines being scanned are scanned in the LCD panel within a third scanning time frame.

Further, when the two adjacent charging scanning lines are scanned and charged simultaneously, one of the pixel units corresponding to the two adjacent charging scanning lines is electrically connected to one of the first data lines via the source of the charging TFT of the pixel unit, and the other of the pixel units corresponding to the two adjacent charging scanning lines is electrically connected to one of the second data lines via the source of the charging TFT of the pixel unit. The first data line and the second data line input data signals to the sources of the charging TFTs of the pixel units corresponding to the two adjacent charging scanning lines respectively.

As compared to the prior art where only one scanning line is scanned within one scanning period, the present disclosure can scan two adjacent charging scanning lines 11 or two adjacent discharging scanning lines 12 simultaneously within one scanning period; and this can reduce the total number of times of scanning operations necessary for scanning one image and, accordingly, extend the scanning pulse duration of each of the charging scanning lines, thereby ensuring the charging time of the gates of the charging TFTs. That is, as compared to LCD panel in the prior art, each gate of the LCD panel 1 of the present disclosure has a sufficient (double) charging time, so the LCD panel 1 can operate at a high frame rate to improve the experience of the user who uses the LCD panel 1.

Alternatively, when four adjacent charging scanning lines are being scanned in the LCD panel 1, four adjacent discharging scanning lines located in pixel unit rows different from those of the four adjacent charging scanning lines being scanned are scanned within a same scanning time frame.

One scanning is defined to correspond to one scanning time frame; and when a scanning time frame in which the four adjacent charging scanning lines are scanned and charged in the LCD panel is a first scanning time frame. The discharging scanning lines connected to the same pixel units as the four adjacent charging scanning lines being scanned are scanned in the LCD panel within a second scanning time frame.

Hereinafter, how to scan four adjacent ones of the charging scanning lines simultaneously in the LCD panel 1 will be illustrated.

Figure 3:
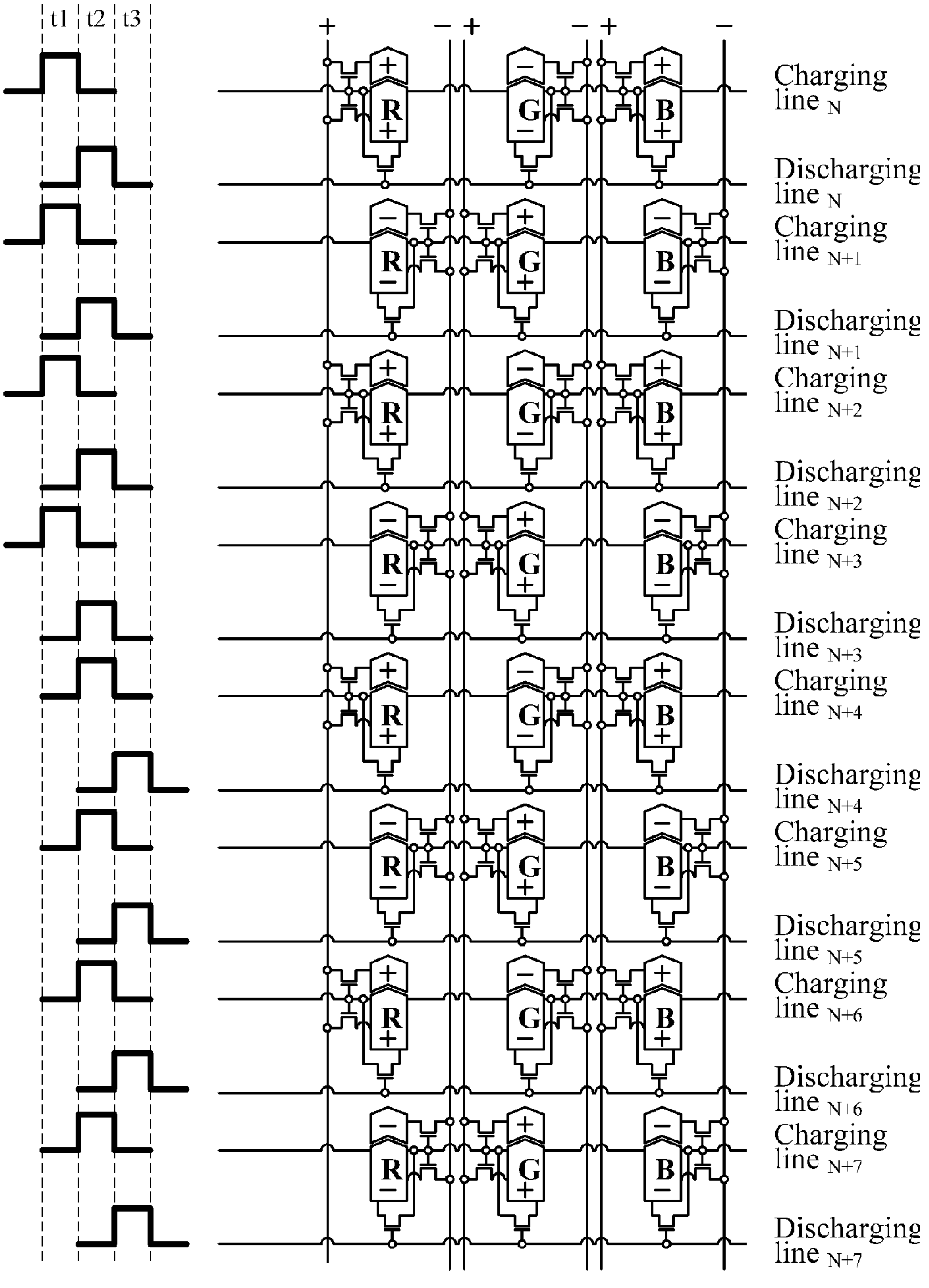
FIG. 3 is a schematic view illustrating electrode structures of the LCD panel and a scanning signal timing sequence thereof according to the second embodiment of the present disclosure.

FIG. 3 is a schematic view illustrating electrode structures of the LCD panel and a scanning signal timing sequence thereof according to the second embodiment of the present disclosure. As shown in FIG. 3, the charging scanning lines 11 are represented as a charging scanning line N to a charging scanning line N+7, and the discharging scanning lines 12 are represented as a discharging scanning line N to a discharging scanning line N+7. A charging scanning line and a discharging scanning line that have a same reference numeral are electrically connected to pixel units in a same row; e.g., the charging scanning line N and the discharging scanning line N are electrically connected to pixel units in an $N^{th}$ row. In addition, t1 to t13 represent scanning time frames in a time sequence.

As shown in FIG. 3, within the scanning time frame t1, a scanning pulse signal of a high level is inputted by the scan driver 15 into the charging scanning line N, the charging scanning line N+1, the charging scanning line N+2 and the charging scanning line N+3 simultaneously. Then, the gates of the TFTs electrically connected to the charging scanning line N, the charging scanning line N+1, the charging scanning line N+2 and the charging scanning line N+3 are turned on, and data voltages are inputted via the first data lines 13 and the second data lines 14 so that a corresponding image is displayed by the pixel units. At this time, the discharging scanning line N, the discharging scanning line N+1, the discharging scanning line N+2 and the discharging scanning line N+3 are all in an OFF state. Therefore, at the end of the scanning time frame t1, the data voltages of the pixel units corresponding to the charging scanning line N, the charging scanning line N+1, the charging scanning line N+2 and the charging scanning line N+3 can be continuously maintained under the action of the storage capacitance.

Within the scanning time frame t2, the charging scanning line N, the charging scanning line N+1, the charging scanning line N+2 and the charging scanning line N+3 all complete the scanning and keep at a low level. A scanning pulse signal of a high level is inputted by the scan driver 15 into the charging scanning line N+4, the charging scanning line N+5, the charging scanning line N+6 and the charging scanning line N+7 as well as the discharging scanning line N, the discharging scanning line N+1, the discharging scanning line N+2 and the discharging scanning line N+3 simultaneously. Then, the gates of the TFTs electrically connected to the charging scanning line N+4, the charging scanning line N+5, the charging scanning line N+6 and the charging scanning line N+7 are turned on, and data voltages are inputted via the first data lines 13 and the second data lines 14 so that a corresponding image is displayed by the pixel units. Moreover, because the gates of the TFTs electrically connected to the discharging scanning line N, the discharging scanning line N+1, the discharging scanning line N+2 and the discharging scanning line N+3 are turned on, the data voltages of the pixel units corresponding to the charging scanning line N, the charging scanning line N+1, the charging scanning line N+2 and the charging scanning line N+3 are discharged after having been maintained for the scanning time frame t1.

Within the scanning time frame t3, the charging scanning line N+4, the charging scanning line N+5, the charging scanning line N+6 and the charging scanning line N+7 all complete the scanning and keep at a low level. A scanning pulse signal of a high level is inputted by the scan driver 15 into the charging scanning line N+8 (not shown), the charging scanning line N+9 (not shown), the charging scanning line N+10 (not shown) and the charging scanning line N+11 (not shown) as well as the discharging scanning line N+4, the discharging scanning line N+5, the discharging scanning line N+6 and the discharging scanning line N+7 simultaneously. Then, the gates of the TFTs electrically connected to the charging scanning line N+8 (not shown), the charging scanning line N+9 (not shown), the charging scanning line N+10 (not shown) and the charging scanning line N+11 (not shown) are turned on, and data voltages are inputted via the first data lines 13 and the second data lines 14 so that a corresponding image is displayed by the pixel units. Moreover, because the gates of the TFTs electrically connected to the discharging scanning line N+4, the discharging scanning line N+5, the discharging scanning line N+6 and the discharging scanning line N+7 are turned on, the data voltages of the pixel units corresponding to the charging scanning line N+4, the charging scanning line N+5, the charging scanning line N+6 and the charging scanning line N+7 are discharged after having been maintained for the scanning time frame t2.

Subsequent scanning and charging operations proceed in a similar way. That is, by scanning four charging scanning lines simultaneously, the total number of times of scanning operations necessary for scanning one image is further reduced and, accordingly, the scanning pulse duration of each of the charging scanning lines is further extended, thereby ensuring the charging time of the gates of the charging TFTs electrically connected to the charging scanning lines. As can be appreciated, when four charging scanning lines are simultaneously scanned in the LCD panel 1, each gate of the LCD panel 1 has a sufficient (four times) charging time, so the LCD panel 1 can operate at a higher frame rate to further improve the experience of the user who uses the LCD panel 1.

Depending on different needs, free switching between scanning of two charging scanning lines simultaneously and scanning of four charging scanning lines simultaneously can be achieved in the LCD panel 1 without changing the specification of the pre-existing drive integrated circuit (IC).

According to the above descriptions, the LCD panel of the present disclosure has the following benefits: the charging time available for each gate of the LCD panel of the present disclosure is extended, and the LCD panel can operate at a high frame rate and switch between two driving modes.

Figure 4:
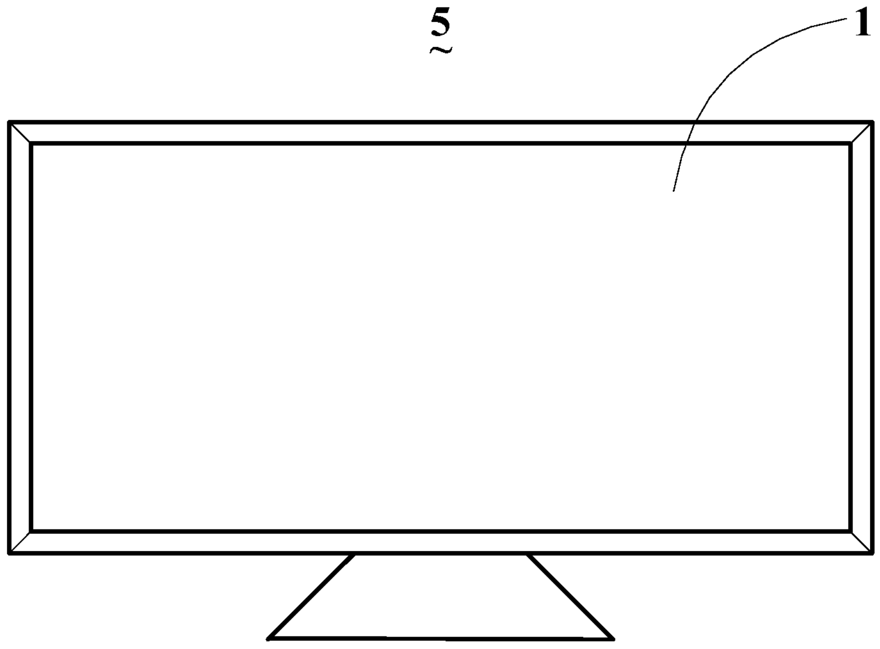
FIG. 4 is a schematic structural view of an LCD device according to the present disclosure.

FIG. 4 is a schematic structural view of an LCD device according to the present disclosure. Referring to FIG. 4, the present disclosure further provides an LCD device 5, which comprises the LCD panel 1. Correspondingly, the LCD device 5 also has the following benefits: the charging time available for each gate is extended, and the LCD device can operate at a high frame rate and switch between two driving modes.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal display (LCD) panel, comprising a plurality of charging scanning lines, a plurality of discharging scanning lines, a plurality of first data lines, a plurality of second data lines, a plurality of pixel units, a data driver and a scan driver; wherein:

the plurality of charging scanning lines and the plurality of discharging scanning lines are arranged alternately and parallel with each other in a first direction, each pixel unit in a same row is connected to one of the charging scanning lines and one of the discharging scanning lines, and the first data lines and the second data lines are arranged alternately and parallel with each other in a second direction and insulatedly intersect the charging scanning lines and the discharging scanning lines;

each pixel unit comprises a charging thin film transistor (TFT), a discharging TFT and a pixel electrode, the charging TFT has a gate electrically connected to one of the charging scanning lines, a source electrically connected to one of the first data lines or one of the second data lines, and a drain electrically connected to the pixel electrode, and the discharging TFT has a gate electrically connected to one of the discharging scanning lines, a source electrically connected to one of the charging scanning lines, the one of the charging scanning lines and the one of the discharging scanning lines connected to the pixel units in a same row, and a drain electrically connected to the pixel electrode;

the plurality of first data lines and the plurality of second data lines are electrically connected to the data driver respectively and transmit data signals to the sources of the charging TFTs; and the scan driver comprises a plurality of first output terminals and a plurality of second output terminals, the plurality of first output terminals and the plurality of second output terminals are arranged alternately, each of the first output terminals is electrically connected to two adjacent charging scanning lines, each of the second output terminals is electrically connected to two adjacent discharging scanning lines, two of the charging scanning lines connected to a same first output terminal are electrically connected through a jumper, and two of the discharging scanning lines connected to a same second output terminal are electrically connected through another jumper;

wherein when two adjacent charging scanning lines are being scanned in the LCD panel, two adjacent discharging scanning lines connected the pixel units in other rows different from those of the two adjacent charging scanning lines being scanned are also scanned within a same scanning time frame.

2. The LCD panel of claim 1, wherein one scanning is defined to correspond to one scanning time frame, and when a scanning time frame in which the two adjacent charging scanning lines are scanned and charged in the LCD panel is a first scanning time frame, the discharging scanning lines connected to the same pixel units as the two adjacent charging scanning lines being scanned are scanned in the LCD panel within a third scanning time frame.

3. The LCD panel of claim 1, wherein when the two adjacent charging scanning lines are scanned and charged simultaneously, one of the pixel units corresponding to the two adjacent charging scanning lines is electrically connected to one of the first data lines via the source of the charging TFT of the pixel unit, and the other of the pixel units corresponding to the two adjacent charging scanning lines is electrically connected to one of the second data lines via the source of the charging TFT of the pixel unit, and the first data line and the second data line input data signals to the sources of the charging TFTs of the pixel units corresponding to the two adjacent charging scanning lines respectively.

4. The LCD panel of claim 1, wherein when four adjacent charging scanning lines are being scanned in the LCD panel, four adjacent discharging scanning lines connected the pixel units in other rows different from those of the four adjacent charging scanning lines being scanned are scanned within a same scanning time frame.

5. The LCD panel of claim 1, wherein the data driver applies data signals of different timings to the first data lines and the second data lines to achieve switching between two-dimensional (2D) displaying and three-dimensional (3D) displaying.

6. An LCD (liquid crystal display) panel, comprising a plurality of charging scanning lines, a plurality of discharging scanning lines, a plurality of first data lines, a plurality of second data lines and a plurality of pixel units, wherein the plurality of charging scanning lines and the plurality of discharging scanning lines are arranged alternately and parallel with each other in a first direction, each pixel unit in a same row is connected to one of the charging scanning lines and one of the discharging scanning lines, the first data lines and the second data lines are arranged alternately and parallel with each other in a second direction and insulatedly intersect the charging scanning lines and the discharging scanning lines, each pixel unit comprises a charging thin film transistor (TFT), a discharging TFT and a pixel electrode, the charging TFT has a gate electrically connected to one of the charging scanning lines, a source electrically connected to one of the first data lines or one of the second data lines, and a drain electrically connected to the pixel electrode, and the discharging TFT has a gate electrically connected to one of the discharging scanning lines, a source electrically connected to one of the charging scanning lines, the one of the charging scanning lines and the one of the discharging scanning lines connected to the pixel units in a same row, and a drain electrically connected to the pixel electrode; wherein when two adjacent ones of the charging scanning lines are being scanned in the LCD panel, two adjacent ones of the discharging scanning lines connected the pixel units in other rows different from those of the two adjacent charging scanning lines being scanned are also scanned within a same scanning time frame.

7. The LCD panel of claim 6, wherein one scanning is defined to correspond to one scanning time frame, and when a scanning time frame in which the two adjacent charging scanning lines are scanned and charged in the LCD panel is a first scanning time frame, the discharging scanning lines connected to the same pixel units as the two adjacent charging scanning lines being scanned are scanned in the LCD panel within a third scanning time frame.

8. The LCD panel of claim 6, wherein when the two adjacent charging scanning lines are scanned and charged simultaneously, one of the pixel units corresponding to the two adjacent charging scanning lines is electrically connected to one of the first data lines via the source of the charging TFT of the pixel unit, and the other of the pixel units corresponding to the two adjacent charging scanning lines is electrically connected to one of the second data lines via the source of the charging TFT of the pixel unit, and the first data line and the second data line input data signals to the sources of the charging TFTs of the pixel units corresponding to the two adjacent charging scanning lines respectively.

9. The LCD panel of claim 6, wherein when four adjacent charging scanning lines are being scanned in the LCD panel, four adjacent discharging scanning lines connected the pixel units in other rows different from those of the four adjacent charging scanning lines being scanned are scanned within a same scanning time frame.

10. The LCD panel of claim 9, wherein one scanning is defined to correspond to one scanning time frame, and when a scanning time frame in which the four adjacent charging scanning lines are scanned and charged in the LCD panel is a first scanning time frame, the discharging scanning lines connected to the same pixel units as the four adjacent charging scanning lines being scanned are scanned in the LCD panel within a second scanning time frame.

11. The LCD panel of claim 6, further comprising a data driver, wherein the plurality of first data lines and the plurality of second data lines are electrically connected to the data driver respectively and transmit data signals to the sources of the charging TFTs.

12. The LCD panel of claim 11, wherein the data driver applies data signals of different timings to the first data lines and the second data lines to achieve switching between two-dimensional (2D) displaying and three-dimensional (3D) displaying.

13. The LCD panel of claim 6, further comprising a scan driver, wherein the scan driver comprises a plurality of first output terminals and a plurality of second output terminals, the plurality of first output terminals and the plurality of second output terminals are arranged alternately, each of the first output terminals is electrically connected to two adjacent ones of the charging scanning lines, each of the second output terminals is electrically connected to two adjacent discharging scanning lines, two of the charging scanning lines connected to a same first output terminal are electrically connected through a jumper, and two of the discharging scanning lines connected to a same second output terminal are electrically connected through another jumper.

14. The LCD panel of claim 6, wherein the charging TFT further comprises a first charging TFT and a second charging TFT, the pixel electrode further comprises a first sub-pixel electrode and a second sub-pixel electrode respectively pointing to different directions, a drain of the first charging TFT is electrically connected to the first sub-pixel electrode, a drain of the second charging TFT is electrically connected to the second sub-pixel electrode, a gate of the first charging TFT and a gate of the second charging TFT are electrically connected to a same one of the charging scanning lines, and a source of the first charging TFT and a source of the second charging TFT are electrically connected to a same one of the first data lines or the second data lines.

15. An LCD (liquid crystal display) device comprising an LCD panel, wherein the LCD panel comprises a plurality of charging scanning lines, a plurality of discharging scanning lines, a plurality of first data lines, a plurality of second data lines and a plurality of pixel units, the plurality of charging scanning lines and the plurality of discharging scanning lines are arranged alternately and parallel with each other in a first direction, each pixel unit in a same row is connected to one of the charging scanning lines and one of the discharging scanning lines, the first data lines and the second data lines are arranged alternately and parallel with each other in a second direction and insulatedly intersect the charging scanning lines and the discharging scanning lines, each of the pixel units comprises a charging thin film transistor (TFT), a discharging TFT and a pixel electrode, the charging TFT has a gate electrically connected to one of the charging scanning lines, a source electrically connected to one of the first data lines or one of the second data lines, and a drain electrically connected to the pixel electrode, and the discharging TFT has a gate electrically connected to one of the discharging scanning lines, a source electrically connected to one of the charging scanning lines, the one of the charging scanning lines and the one of the discharging scanning lines connected to the pixel units in a same row, and a drain electrically connected to the pixel electrode; wherein when two adjacent ones of the charging scanning lines are being scanned in the LCD panel, two adjacent discharging scanning lines connected the pixel units in other rows different from those of the two adjacent charging scanning lines being scanned are also scanned within a same scanning time frame.

16. The LCD device of claim 15, wherein one scanning is defined to correspond to one scanning time frame, and when a scanning time frame in which the two adjacent charging scanning lines are scanned and charged in the LCD panel is a first scanning time frame, the discharging scanning lines connected to the same pixel units as the two adjacent charging scanning lines being scanned are scanned in the LCD panel within a third scanning time frame.

17. The LCD device of claim 15, wherein when the two adjacent charging scanning lines are scanned and charged simultaneously, one of the pixel units corresponding to the two adjacent charging scanning lines is electrically connected to one of the first data lines via the source of the charging TFT of the pixel unit, and the other of the pixel units corresponding to the two adjacent charging scanning lines is electrically connected to one of the second data lines via the source of the charging TFT of the pixel unit, and the first data line and the second data line input data signals to the sources of the charging TFTs of the pixel units corresponding to the two adjacent charging scanning lines respectively.

18. The LCD device of claim 15, wherein when four adjacent ones of the charging scanning lines are being scanned in the LCD panel, four adjacent ones of the discharging scanning lines connected the pixel units in other rows different from those of the four adjacent charging scanning lines being scanned are scanned within a same scanning time frame.

19. The LCD device of claim 15, wherein the LCD panel further comprises a data driver, and the plurality of first data lines and the plurality of second data lines are electrically connected to the data driver respectively and transmit data signals to the sources of the charging TFTs.

20. The LCD device of claim 15, wherein the LCD panel further comprises a scan driver, the scan driver comprises a plurality of first output terminals and a plurality of second output terminals, the plurality of first output terminals and the plurality of second output terminals are arranged alternately, each of the first output terminals is electrically connected to two adjacent charging scanning lines, each of the second output terminals is electrically connected to two adjacent discharging scanning lines, two of the charging scanning lines connected to a same first output terminal are electrically connected through a jumper, and two of the discharging scanning lines connected to a same second output terminal are electrically connected through another jumper.

* * * * *